United States Patent
Hawrylko et al.

(10) Patent No.: US 8,629,203 B2
(45) Date of Patent: Jan. 14, 2014

(54) RIGID BIOFIBER THERMOPLASTIC COMPOSITE AND ARTICLES MADE THEREFROM

(75) Inventors: Roman B. Hawrylko, Avon Lake, OH (US); Sang H. Lee, Westlake, OH (US)

(73) Assignee: PolyOne Corporation, Avon Lake, OH (US)

( * ) Notice: Subject to any disclaimer, the term of this patent is extended or adjusted under 35 U.S.C. 154(b) by 0 days.

(21) Appl. No.: 13/580,619

(22) PCT Filed: Feb. 16, 2011

(86) PCT No.: PCT/US2011/025104
§ 371 (c)(1),
(2), (4) Date: Aug. 22, 2012

(87) PCT Pub. No.: WO2011/106220
PCT Pub. Date: Sep. 1, 2011

(65) Prior Publication Data
US 2013/0053476 A1    Feb. 28, 2013

Related U.S. Application Data

(60) Provisional application No. 61/308,165, filed on Feb. 25, 2010.

(51) Int. Cl.
*B29C 47/00* (2006.01)
*C08F 118/02* (2006.01)
*C08F 20/44* (2006.01)
*C08F 14/06* (2006.01)
*C08F 210/00* (2006.01)

(52) U.S. Cl.
USPC ............. 524/13; 526/344; 526/319; 526/348; 526/341

(58) Field of Classification Search
USPC ................... 524/13; 526/344, 319, 348, 341
See application file for complete search history.

(56) References Cited

U.S. PATENT DOCUMENTS

| | | |
|---|---|---|
| 5,981,067 A | 11/1999 | Seethamraju et al. |
| 5,981,631 A | 11/1999 | Ronden et al. |
| 6,011,091 A | 1/2000 | Zehner |
| 6,015,612 A | 1/2000 | Deaner et al. |
| 6,280,667 B1 | 8/2001 | Koenig et al. |
| 6,337,138 B1 | 1/2002 | Zehner et al. |
| 6,344,268 B1 | 2/2002 | Stucky et al. |
| 6,498,205 B1 | 12/2002 | Zehner |
| 6,511,757 B1 | 1/2003 | Brandt et al. |
| 6,780,359 B1 | 8/2004 | Zehner et al. |

(Continued)

FOREIGN PATENT DOCUMENTS

JP    07016953    1/1995

OTHER PUBLICATIONS

Sartomer SR-350 Product Bulletin for Trimethylolpropane Trimethacrylate (1998).

(Continued)

*Primary Examiner* — William Cheung
(74) *Attorney, Agent, or Firm* — John H. Hornickel

(57) ABSTRACT

Coated reinforcing biofiber for thermoplastic articles is disclosed. The coating on the biofiber comprises a plastisol. The coated reinforcing biofiber can be used in thermoplastic compounds to simulate the appearance of natural wood while adding significantly increased flexural modulus for the wood plastic composite (WPC).

20 Claims, 1 Drawing Sheet

(56) References Cited

U.S. PATENT DOCUMENTS

| | | |
|---|---|---|
| 6,955,735 B2 | 10/2005 | Kusek |
| 7,030,179 B2 | 4/2006 | Patterson et al. |
| 7,186,457 B1 | 3/2007 | Zehner et al. |
| 2003/0015279 A1 | 1/2003 | Kusek |
| 2006/0252901 A1 | 11/2006 | Narayan et al. |
| 2006/0267238 A1* | 11/2006 | Wang .............................. 264/122 |
| 2008/0119589 A1 | 5/2008 | Majewski et al. |
| 2008/0261019 A1 | 10/2008 | Shen et al. |
| 2008/0318042 A1 | 12/2008 | Kusek et al. |
| 2009/0292046 A1 | 11/2009 | Dorgan et al. |

OTHER PUBLICATIONS

Millenium Decking "Your Lifestyle Enhanced" Webpage—www.millenniumdecking.com/product.html (2008).

Millenium Decking "Millenium Decking System" Webpages—www.tarheelwoodtreating.com/products/milleniumdecking.html (2008).

* cited by examiner

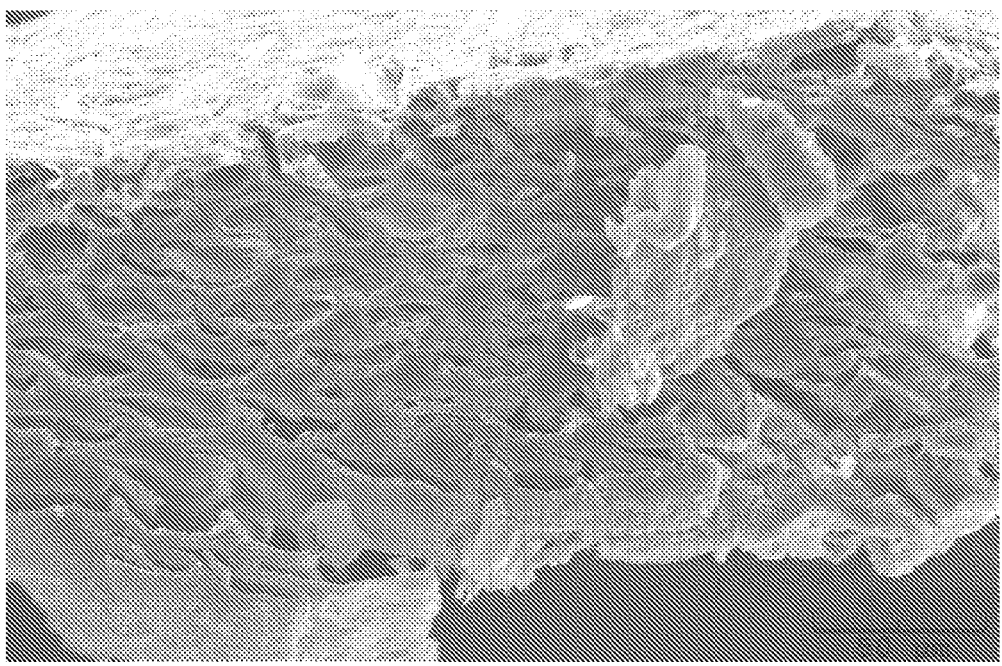

US 8,629,203 B2

RIGID BIOFIBER THERMOPLASTIC COMPOSITE AND ARTICLES MADE THEREFROM

CLAIM OF PRIORITY

This application is a U.S. National stage of International Application No. PCT/US2011/025104 filed Feb. 16, 2011, which claims priority from U.S. Provisional Patent Application Ser. No. 61/308,165 bearing and filed on Feb. 25, 2010, which is incorporated by reference.

FIELD OF THE INVENTION

This invention relates to use of a plastisol to coat biofiber for use in plastic articles.

BACKGROUND OF THE INVENTION

Plastic has taken the place of other materials in a variety of industries. In the packaging industry, plastic has replaced glass to minimize breakage, reduce weight, and reduce energy consumed in manufacturing and transport. In other industries, plastic has replaced metal to minimize corrosion, reduce weight, and provide color-in-bulk products. Recently, an entire industry has arisen called "wood polymer composites" (WPC).

Wood polymer composites are based on the premise that use of biofiber, such as wood fiber and other naturally occurring particulates, as additives to thermoplastic compounds can simulate the appearance of wood while also providing the durability of plastic. Outdoor decorative and structural wood building materials, such as decking, railings, windows, etc. are being made from WPC materials, with and without capstock outer layers.

The ability of the WPC material to simulate the appearance of the natural wood, including its surface texture and wood grain coloration is key to value of the WPC to successfully replace the natural wood itself. Moreover, use of common wood fiber, such as pine, to simulate the appearance of exotic wood is environmentally friendly.

The art has attempted, without success, to provide WPC materials wherein the wood content of the WPC exceeds 50 weight percent.

U.S. Pat. No. 6,498,205 (Zehner) discloses a dry blend of thermoplastic material powder and cellulosic material of about 50% by weight.

SUMMARY OF THE INVENTION

What the art needs is a composition to durably coat biofiber, such as wood fiber or wood flour, so that the coated biofiber can be used with thermoplastic compounds at loadings exceeding about 50 weight percent of the compound, in order to simulate the appearance of natural wood in a WPC which has tremendous flexural modular strength and high heat distortion resistance.

The present invention solves the problem in the art by using a plastisol to coat biofiber to dramatically and unexpectedly increase the reinforcing capacity of the biofiber in a thermoplastic compound, based on the compound's flexural modulus value.

One aspect of the invention is a coated reinforcing biofiber, comprising (a) biofiber and (b) plastisol having a Brookfield viscosity (ASTM D1824 25° C., 20 rpm) of about 1200-3000 centipoise, and wherein the plastisol is rigidsol.

Another aspect of the invention is a compound of thermoplastic resin and coated reinforcing biofiber described above.

Another aspect of the invention is a shaped article made from the compound, whether molded or extruded.

One feature of the present invention is that coated plastisol on the biofiber remains durably on the biofiber in subsequent compounding of the coated reinforcing biofiber with thermoplastic compounding ingredients.

Another feature of the invention is the unexpectedly superior flexural modulus, tensile modulus, low water absorption, and heat distortion properties achieved by the reinforcement of the biofiber, so much so that the use of WPC might be suitable for expansion beyond current building material uses into more significant load-bearing uses.

Other features will become apparent from a description of the embodiments of the invention in relation to the following drawing.

BRIEF DESCRIPTION OF THE DRAWING

FIG. 1 is a photo image at 400 magnification of a cross-section of a coated reinforcing biofiber of the present invention, showing coating on the outer surface, not the inner surfaces of the biofiber.

EMBODIMENTS OF THE INVENTION

Reinforcing Plastisol

Plastisols useful in the present invention are those which are formed from dispersion-, microsuspension-, and emulsion-grade poly(vinyl chloride) (PVC) resins (homopolymers and copolymers) and plasticizers. Exemplary dispersion-grade PVC resins are disclosed in U.S. Pat. Nos. 4,581,413; 4,693,800; 4,939,212; and 5,290,890, among many others such as those referenced in the above four patents.

Desirably, the plastisols are formulated to be rigid, rather than flexible, upon fusing of the PVC resin particles. Sometimes, these type of plastisols are called "rigidsols" in order to emphasize that, while they have begun their use as a flowable resin, after fusing, they are a rigid plastic.

Plastisols desirable in the present invention are those which, when fused, have a Shore D hardness (ASTM D2240-02 after 15 seconds) of more than about 60 and preferably more than 70. Also, desirable plastisols, when fused, can have a Tensile Strength (ASTM D638) of more than about 7000 psi (48 MPa) and preferably more than 8000 or 9000 psi (55-62 MPa). Finally, the desirable plastisols, when fused, exhibit only a small amount of Percent Elongation (ASTM D638) of less than 10% and preferably less than 5%.

Presently preferred plastisols for use in the present invention are those commercially available from Zeon Technologies and Kusek and Associates as Pultuff™ brand plastisol resins for structural composite applications. Currently, the suitable Pultuff grades are the Series 1000, 2000, and 3000. Such grades are identified as rigid, phthalate-free plastisols which are low in viscosity (Brookfield viscosities (ASTM D1824 25° C., 20 rpm) of about 1200-3000 centipoise).

As explained by the manufacturer, Pultuff™ resins contain no styrene, no volatile monomers or solvents, no phthalate plasticizers and provide an environmentally-compliant option for the compounder. Pultufform resin systems exhibit extended storage life and will not harden in the application equipment, providing easy maintenance, minimal cleanup plus the ability to shut down for several days without resin and equipment cleanup. Minimal time and effort are required for shutdown and startup. This simplifies shutdown and eliminates waste.

The physical properties attained using Pultuff™ resins are similar and in some cases superior to those attained using thermoset resins.

Optional Functional Additives

Plastisols usually include more than polyvinyl chloride particles and plasticizer. Non-limiting examples of functional additives, which can also be present in the plastisols for this invention, include heat stabilizers, UV absorbers, fillers, release agents, biocides, pigments, and combinations thereof. Such functional additives are available from a number of commercial sources known to those working the plastics industry and might also be present in commercially available plastisols, such as the Pultuff™ resins identified above.

Biofiber

For avoidance of doubt, "biofiber" refers to both a single fiber of naturally-occurring particulate material as well as a plurality of many fibers. As is often the case in the English language, what appears to be a singular also includes many of the same, for example, when referring to sheep and other herding animals.

Any naturally-occurring particulate material from a renewable resource is a candidate for being coated by the composition of the present invention. The attention given to renewable resources of naturally-occurring materials for use in plastic articles has opened markets for supply of many different types of plant matter and animal matter.

Non-limiting examples of plant matter include wood fiber, wood flour, flax, fibrils of grass, fragments of plant shells, fragments of husks, plant pulp, plant hulls, plant seeds, plant fibers, and the like, and combinations thereof. Wood fiber is most prevalent, particularly pine. However, for purposes of an ornamental surface, it is possible to choose a particular type of plant matter to create an appealing texture or appearance in the surface of the WPC after molding or extrusion.

Non-limiting examples of animal matter include mammalian hair, bone fragments, fragments of animal shells, reptilian hide fragments, and the like, and combinations thereof. Again, for purposes of an ornamental surface, it is possible to choose a particular type of animal matter to create an appealing texture or appearance in the surface of the WPC after molding or extrusion.

The biofiber can have an aspect ratio ranging from about 1 to about 100, and preferably from about 2 to about 10. The biofiber can have a length ranging from about 10 microns to about 6 mm, and preferably from about 50 microns to about 2 mm.

The biofiber can be sized to pass through 20 mesh, desirably through 30 mesh and preferably through 40 mesh.

A mixture of different biofiber types can be used in the invention in order to create different colorations and textures in the final plastic article designed to simulate natural wood.

Table 1 shows the acceptable, desirable and preferred weight percents of ingredients for coating biofiber with colorant compositions of the present invention.

TABLE 1

| Ingredient (Wt. %) | Acceptable Range | Desirable Range | Preferred Range |
| --- | --- | --- | --- |
| Plastisol | 15-50% | 20-40% | 25-30% |
| Biofiber | 50-85% | 60-80% | 65-75% |
| Optional Additives | 0-5% | 0.5-4% | 1-3% |

The mixing equipment used to coat the biofiber can also be any suitable equipment already used in the art of mixing liquids and solids together, especially high intensity mixing equipment also capable of operating at an elevated temperature. Examples are high intensity mixers available under trade names "Henschel" or "Welex" or plow mixers manufactured by the Littleford-Day Company. Such mixers are equipped mixing elements that produce intense mixing of liquid and dry ingredients. These mixers can also be equipped with a cooling or heating jacket for controlling the temperature of the batch.

Mixing equipment can operate at mixing speeds ranging from about 100 rpm to about 1000 rpm, and preferably from about 500 to about 800 rpm. Mixing equipment can operate at temperatures ranging from about ambient to about 30° C., and preferably at ambient.

The mixing speed can be arranged in stages, with lower speeds being used initially to disperse the plastisol into the mass of biofiber and then a higher speed to thoroughly integrate the liquid with the solid and break any "agglomerates" of biofiber.

Preferably, the biofiber dried to a minimum amount of moisture and then charged to a Henschel type mixer operating at a low speed, approximately 700 rpm and at ambient temperature. The plastisol and any optional functional additive(s) are added to the mixer under agitation. Mixing is then continued for three to four minutes and the coated biofiber is then placed into a sealed plastic bag for further processing with the plastic resin to make WPC.

Plastic Resin and WPC

Coated reinforcing biofiber can be used as an ingredient in WPC building materials and any other plastic article intended to simulate a naturally-occurring material. The coated reinforcing biofiber can be letdown into plastic resins and other ingredients useful for making molded or extruded articles in weight percents ranging from about 55% to about 80%, and preferably from about 60% to about 80%. Unexpectedly, WPC of the present invention can be extruded with such predominance of biofiber content. The biofiber must be coated reinforcing biofiber described above for extrusion to even be possible at such high loadings of biofiber in the WPC.

The plastic resins can be acrylonitrile-butadiene-styrene (ABS), polyvinyl chloride (PVC), chlorinated polyvinyl chloride (CPVC), polybutylene terephthalate (PBT), polymethyl methacrylate (PMMA), styrene-acrylonitrile (SAN), polyphenylene ether (PPE), polycarbonate (PC), styrene-butadiene-styrene (SBS), acrylic polymers, polyolefins, polymethylmethacrylate (PMMA), polyethylene terephthalate glycol comonomer (PETG), thermoplastic copolyester elastomer (COPE), and the like, and combinations thereof. Of these, PVC is preferred because the plastisol coating on the biofiber fuses well with PVC.

The plastic resin can be in pellet, cube, or powder form. Preferably, the plastic resin is in powder form for dry blending mixing with the coated reinforcing biofiber and subsequent extruding into any profile suitable for use in industry.

Other ingredients used in the plastic compounding can include additional colorants, ultraviolet stabilizers, processing aids, and the like.

Usefulness of the Invention

When using PVC as the plastic resin, the coated reinforcing biofiber described above causes the WPC to have a Flexural Modulus (ASTM D790) of at least 50% more than the WPC of PVC and uncoated biofiber, with the same loading of biofiber in both instances. Moreover, the Flexural Modulus (ASTM D790) of WPC of the present invention can be at least 500,000 psi (3447 MPa), can exceed 700,000 psi (4826 MPa), and has been found with biofiber loading of 80 weight percent to exceed 900,000 psi (6205 MPa).

Heat distortion temperature exceeds 75° C. and can exceed 87° C. or even 100° C. at the higher loadings of coated reinforcing biofiber in the WPC.

Structural strength of WPC of the present invention allows WPC to become useful in heavier load-bearing structural capacities than previously possible for conventional WPC. Non-limiting examples of WPC usage include wall studs, truss supports, beams, windows, doors, fascia, siding, trim, etc. in addition to the conventional uses of WPC in construction, such as decking, fencing, ornamental non-load-bearing appurtenances, etc.

Appearance of WPC of the present invention can be determined by the profile of the extrusion die from which the WPC emerges after mixing of the coated reinforcing biofiber with the plastic resin. Generally, the WPC has smooth surface and a fine mottled non-woven fiber appearance.

Other embodiments appear in the examples.

EXAMPLES

Table 2 shows the ingredients to prepare coated reinforcing biofiber and the WPC of the present invention.

TABLE 2

Coated Reinforcing Biofiber Ingredients

| Wt. Percent | Example 1 | Example 2 |
| --- | --- | --- |
| Zeon Pultuff ™ 2000 Plastisol (Zeon Technologies) Hardness, when fused, of 77.4 Shore D instantaneously and 71.1 Shore D after 15 sec. delay (ASTM D2240-02) | 30 | 20 |
| Wood Fiber (4025 BB 40 mesh White Pine from American Wood Fibers) pre-dried to <2% moisture | 70 | 80 |

The pre-dried wood fiber was mixed into the plastisol as follows:

In a laboratory-sized Henschel mixer, the plastisol was added to the pre-dried wood fiber and then mixed at 700 rpm using a 3-blade type disperser fitted with 21 cm diameter blades. After mixing the liquid ingredients for 3-5 minutes at ambient temperature, the batch is then completed. Some heat may have been created in the mixer from shear mixing, but the coated reinforcing fiber was not hot at the completion of mixing. The resulting coated reinforcing biofiber is non-agglomerated and retains the overall straw yellow appearance of the wood fiber itself. Remarkably, the biofiber is coated on the outer surface only, not penetrated with plastisol as seen in FIG. 1, a photo of a cross-section of a coated reinforcing biofiber of Example 2 at a resolution of 400×. The inner surfaces within the biofiber are not contacted with plastisol. The lighter color on the surface in the upper left quadrant of the photo is the coating, whereas the inner surfaces, in cross section, in the remainder of the photo, are not coated.

Separately, in a Henshel mixer, using conventional mixing technique, two different PVC polymer compounds were made, dropping at 104° C. Table 3 shows the two formulations of PVC resins.

TABLE 3

PVC Polymer Compound Ingredients

| Wt. Percent | Example 3 | Example 4 |
| --- | --- | --- |
| 0.92 intrinsic viscosity polyvinyl chloride resin | 67.72 | 90.29 |
| Methyltin mecaptoacetate | 1.35 | 1.35 |
| Merkon ™ acrylic process aid | 2.71 | 2.71 |
| Geon ™ 129 × 115 polyvinyl chloride dispersion resin (PolyOne) | 22.57 | 0.00 |
| Calcium Stearate | 2.71 | 2.71 |
| Rheolube ™ 165 paraffin wax (Struktol) | 0.68 | 0.68 |
| Advawax ™ 280-RH ethylene-bis-stearamide (EBS) wax (Rohm & Haas) | 2.26 | 2.26 |

Table 4 shows the formulations for WPC thermoplastic compounds made using the coated reinforcing biofiber of Examples 1 and 2 and the PVC polymer compounds of Examples 3 and 4 (Examples 5-8) and recipes of Comparative Examples A and B using uncoated biofiber of the same type as used to prepare Examples 1 and 2.

Before extrusion, the biofiber from Example 1 or Example 2 at 80 weight percent was pre-mixed with the PVC polymer compound of Example 3 or Example 4 at 20 weight percent using a heated ribbon blender for 15 minutes and then the ribbon blender for another 15 minutes without heat to cool the dried, blended mixture down to ambient temperature. The heating was supplied by steam on the jacket.

The dry blend of biofiber and polymer compound was then extruded in a conventional manner at a temperature above 171° C. to react and fuse the plastisol coating on the biofiber, also above the melting point of the PVC polymer compound, in order to extrude the WPC into pellets for further processing into a compression molding press to make test plaques.

For Examples 5 and 6 and Comparative Example A, the laboratory-sized extruder was a 1.9 cm (0.75 inch) twin-screw counter-rotating Brabender CTSE-V brand extruder, with 600 R, L type screws but no breaker plate or screens, at a speed of 8-12 rpm with a 0.32 cm×4.44 cm (0.125"×1.75") die operating at zones of temperature of 174° C., 180° C. and 180° C. and a die temperature of 180° C. The extruder operated very well for Examples 5 and 6 in spite of the fact that 80 weight percent of the extrudate was coated reinforcing biofiber. This was unexpected because WPC of PVC and biofiber, with a biofiber content of more than 60 weight percent, has been known in the industry to be non-extrudable because of lack of melt integrity and strength. As confirmation, Comparative Example A was unable to extrude at all.

For Examples 7 and 8 and Comparative Example B, the same conditions were used, except the zones of temperatures were 174° C., 174° C., and 174° C. and the die temperature was 174° C., with the same results at this lower extrusion temperature.

Dry blends of the Examples were also compression molded.

TABLE 4

Wood Plastic Composite Ingredients and Properties

|  | 5 | A | 6 | B | 7 | 8 |
|---|---|---|---|---|---|---|
| Ingredients in Weight Percent | | | | | | |
| Example 1 biofiber (Dried to less than 2% moisture) | 80 | 0 | 80 | 0 | 0 | 0 |
| Example 2 biofiber (Dried to less than 2% moisture) | 0 | 0 | 0 | 0 | 80 | 80 |
| Wood Fiber (4025 BB 40 mesh White Pine from American Wood Fibers) pre-dried to <2% moisture | 0 | 80 | 0 | 80 | 0 | 0 |
| Example 3 PVC polymer compound | 20 | 20 | | | 20 | |
| Example 4 PVC polymer compound | | | 20 | 20 | | 20 |
| Effective % Plastisol | 24 | 0 | 24 | 0 | 16 | 16 |
| Effective % Wood Fiber | 56 | 80 | 56 | 80 | 64 | 64 |
| Effective % PVC plastic resin | 20 | 20 | 20 | 20 | 20 | 20 |
| Extruding Properties | | | | | | |
| Extrudability in a Twin Screw Brabender into 0.32 cm × 4.44 cm strip | Well | None | Well | None | Well | Well |
| Torque (Mg) | 10,244 | — | 11,836 | — | 12,698 | 15,747 |
| IR Melt (° C.) | 176 | — | 179 | — | 163 | 168 |
| Physical Properties of Compression Molded Plaques* | | | | | | |
| % strain at break | 0.57 | ** | 0.57 | ** | 0.32 | 0.53 |
| Tensile Modulus × $10^5$ (psi) | 11.00 | ** | 10.2 | ** | 7.9 | 12.5 |
| Tensile Strength (psi) | 3,470 | ** | 3,860 | ** | 1,920 | 3,910 |
| Flexural Modulus × $10^5$ (psi) | 8.76 | 5.72 | 9.52 | 4.24 | 7.33 | 9.22 |
| Flexural Strength (psi) | 6,910 | 3,260 | 7,520 | 2760 | 6,060 | 7,540 |
| Percent Improvement in Flexural Modulus (3 or 4 vs. A and 5 or 6 vs. B) | 53.1% | — | 66.4% | — | 72.8% | 117.4% |
| Hardness, Shore D (15 sec) ASTM D2240-02 | 82 | | 84 | | 74 | 76 |
| Specific gravity | 1.380 | | 1.36 | | 1.34 | 1.36 |
| 72 hr Water Immersion*** | 6.10% | 66.60% | 5.40% | 88.60% | 6.70% | 5.90% |
| HDT, 66 psi unannealed (° F.) (ASTM D648) | 210 | 190 | 225 | 169 | 191 | 205 |
| Sag at 100° C.**** | 0.1" | 0.075" | 0.1" | 0.075" | 0.25" | 0.125" |

*15.24 cm × 15.24 cm × 0.32 cm plaques pressed on a 150 ton Wabash Press at 191° C. and 130 tons.
** Unable to router or cut the compression molded samples because of breaking and cracking caused by lack of strength and integrity
***Percent weight gain after immersion in tap water after three days.
****Test procedure explained in Balasko et al., "Miscible and Immiscible Vinyl Blends on Heat Deflection Temperature and Oven Sag" (VinylTec, October 1989)

Examples 5 and 6 give superior performance to Comparative Example A. The Tensile Modulus and Heat Distortion Temperature were improved for Examples 5 and 6 over Comparative Example A. But the Extrudability, 100° C. Oven Sag, outstanding Flexural Modulus, and outstanding Water Immersion results are truly unexpected. The Flexural Modulus is between 50 and 67% better over Comparative Example A. Examples 5 and 6 absorb a magnitude lower percentage of water compared with Comparative Example A.

Examples 7 and 8 give superior performance to Comparative Example B in a similar manner, with even more outstanding and unexpected Flexural Modulus and Water Immersion comparative performance.

Without being limited to particular theory, it is believed that the temperature of extrusion or molding causes the plastisol coating on each biofiber to fuse within the melt of the polymer compound, thereby providing an interface between polymer and biofiber which is incredibly inflexible. The coating of the plastisol upon the biofiber without penetration into the biofiber maximizes the plastisol available for that fusing interface between biofiber and polymer. The strength of that interface is believed to be a significant reason for the ability to form integrally stable extruded strips and compression molded plaques with incredibly strong flexural properties at thicknesses of 0.32 cm.

Further experimentation has demonstrated that the extruded material can be re-ground and re-extruded to result in essentially the same properties and performance values. Recycling of this WPC is possible without significant loss of properties.

According to known physics of materials, every unit (x) of increased thickness increases the flexural properties by that unit to the third power ($x^3$). For example, the flexural modulus of Example 5 plaque at 0.64 cm thickness would be 672×$10^5$ psi. A new load-bearing building material of sustainable resources has been invented.

All Examples demonstrate the ability to use a dominating percentage (greater than 55% by weight) of biofiber, a naturally occurring material, which is important in the goals of sustainability for building materials. Because the physical properties of this inventive WPC exceed the physical properties of conventional WPC (such as Comparative Examples A and B but with a lower percentage of biofiber), a valuable new, sustainable building material is now possible which can be either extruded or molded into the final shaped article.

The invention is not limited to the above embodiments. The claims follow.

What is claimed is:

1. A compound, comprising:
   (1) a coated reinforcing biofiber and
   (2) a plastic resin,
   wherein the compound, when molded into a plaque has a Flexural Modulus (ASTM D790) of at least 50% more than a compound of uncoated biofiber and the plastic resin, wherein the coated reinforcing biofiber comprises:
   (a) biofiber and
   (b) plastisol having a Brookfield viscosity (ASTM D1824 25° C., 20 rpm) of about 1200 - 3000 centipoise, and
   wherein the coated reinforcing biofiber is present in the compound in a weight percent ranging from about 55% to about 80%.

2. The compound, according to claim 1, wherein the plastisol, when fused as a resin, has
   (1) a Shore D hardness (ASTM D2240-02 after 15 seconds) of more than 60,
   (2) a Tensile Strength (ASTM D638) of more than about 48 MPa,
   (3) a Percent Elongation (ASTM D638) of less than 10%.

3. The compound of claim 1, wherein the biofiber comprises plant matter or animal matter.

4. The compound of claim 1, wherein the biofiber comprises plant matter selected from the group consisting of wood fiber, wood flour, flax, fibrils of grass, fragments of plant shells, fragments of husks, plant pulp, plant hulls, plant seeds, plant fibers, and combinations thereof.

5. The compound of claim 1, wherein the biofiber comprises animal matter selected from the group consisting of mammalian hair, bone fragments, fragments of animal shells, reptilian hide fragments, and combinations thereof.

6. The compound of claim 1, wherein the biofiber has an aspect ratio ranging from about 1 to about 100 and a length ranging from about 10 microns to about 6 mm.

7. The compound of any one of claim 3, wherein the plastisol further comprises heat stabilizers, UV absorbers, fillers, release agents, biocides, pigments, or combinations thereof.

8. The compound of claim 7, wherein the plastisol, the biofiber, and any optional additives are present in the coated reinforcing biofiber in the following weight percents:

| | |
|---|---|
| Plastisol | 15-50% |
| Biofiber | 50-85% |
| Optional Additives. | 0-5% |

9. The compound of any one of claim 1, wherein the plastisol is coated on an outer surface of the biofiber but not contacting inner surfaces within the biofiber.

10. The compound of claim 1, wherein the Flexural Modulus of the compound is at least 3447 MPa.

11. The compound of claim 1, wherein the Flexural Modulus of the compound exceeds 4826 MPa.

12. The compound of claim 10, wherein the plastic resin is selected from the group consisting of acrylonitrile-butadiene-styrene (ABS), polyvinyl chloride (PVC), chlorinated polyvinyl chloride (CPVC), polybutylene terephthalate (PBT), polymethyl methacrylate (PMMA), styrene-acrylonitrile (SAN), polyphenylene ether (PPE), polycarbonate (PC), styrene-butadiene-styrene (SBS), acrylic polymers, polyolefins, polymethylmethacrylate (PMMA), polyethylene terephthalate glycol comonomer (PETG), thermoplastic copolyester elastomer (COPE), and combinations thereof.

13. The compound of claim 12, wherein the plastic resin is in powder form and where the compound is a dry blend of the plastic resin and the coated reinforcing fiber.

14. A shaped article comprising a compound of claim 1.

15. The shaped article of claim 14, wherein the compound is extruded or molded into a building material.

16. The shaped article of claim 15, wherein the building material is a wood plastic composite (WPC) in a shape selected from the group consisting of wall studs, truss supports, beams, windows, doors, fascia, siding, trim, decking, fencing, and ornamental non-load-bearing appurtenances.

17. A building material made of a compound of claim 1.

18. The compound of claim 2, wherein the biofiber comprises plant matter or animal matter.

19. The compound of claim 2, wherein the biofiber comprises plant matter selected from the group consisting of wood fiber, wood flour, flax, fibrils of grass, fragments of plant shells, fragments of husks, plant pulp, plant hulls, plant seeds, plant fibers, and combinations thereof.

20. The compound of claim 2, wherein the biofiber has an aspect ratio ranging from about 1 to about 100 and a length ranging from about 10 microns to about 6 mm.

* * * * *